US008724639B2

(12) United States Patent
Mahmoud (10) Patent No.: US 8,724,639 B2
(45) Date of Patent: May 13, 2014

(54) SMART HOME HUB

(76) Inventor: Mohamed K. Mahmoud, Richardson, TX (US)

(*) Notice: Subject to any disclaimer, the term of this patent is extended or adjusted under 35 U.S.C. 154(b) by 405 days.

(21) Appl. No.: 12/636,678

(22) Filed: Feb. 26, 2010

(65) Prior Publication Data

US 2011/0211584 A1    Sep. 1, 2011

(51) Int. Cl.
*H04L 12/28*    (2006.01)
*H04J 1/16*    (2006.01)

(52) U.S. Cl.
USPC ........... 370/401; 370/252; 370/352; 370/386; 370/430

(58) Field of Classification Search
USPC ......... 370/352, 252, 401, 386, 430, 390, 338; 725/100, 139
See application file for complete search history.

(56) References Cited

U.S. PATENT DOCUMENTS

| | | | | |
|---|---|---|---|---|
| 6,317,489 | B1* | 11/2001 | Parsadayan | 379/102.06 |
| 8,031,726 | B2* | 10/2011 | Ansari et al. | 370/401 |
| 2006/0218575 | A1* | 9/2006 | Blair | 725/28 |
| 2007/0217436 | A1* | 9/2007 | Markley et al. | 370/401 |
| 2008/0056718 | A1* | 3/2008 | Parker | 398/58 |
| 2008/0117922 | A1* | 5/2008 | Cockrell et al. | 370/401 |
| 2008/0134239 | A1* | 6/2008 | Knowles et al. | 725/39 |
| 2009/0158370 | A1* | 6/2009 | Li et al. | 725/110 |
| 2010/0064324 | A1* | 3/2010 | Jenkin et al. | 725/59 |
| 2010/0103943 | A1* | 4/2010 | Walter | 370/401 |
| 2010/0278345 | A1* | 11/2010 | Alsina et al. | 380/283 |
| 2011/0107379 | A1* | 5/2011 | Lajoie et al. | 725/87 |
| 2011/0131617 | A1* | 6/2011 | Olson | 725/82 |
| 2011/0296481 | A1* | 12/2011 | Cholas et al. | 725/109 |

* cited by examiner

*Primary Examiner* — John Pezzlo
(74) *Attorney, Agent, or Firm* — Maqsood Ahmad (57) ABSTRACT

The present invention provides a method and device for an integrated smart hub. The method and device for an integrated smart hub provides for a simultaneously multicasting of a plurality of functions with a simple and an easy process to operate the device. The integrated device utility includes applications in the areas of telephony, data processing, content storage, multimedia, augmentative communications, personal computing, home or facility security and automation. The integrated smart hub system incorporates integrated components and functions including a Set Top Box (STB), telephone modem, wireless modems, Optical Network Terminal (ONT), Very-high-speed Digital Subscriber Line (VDSL), data server, video server, solid-state storage, game server, an Internet Protocol (IP) intelligent gateway router, and a plurality of microprocessors.

12 Claims, 10 Drawing Sheets

Data/Signal Flow Diagram

Process of Selecting a TV Channel

Figure 8

Process of Selecting a Video Content

Figure 9

Process of Accessing the Internet from a PC or Laptop

Figure 10

Process of Selecting Security Status

Figure 11

Making and Managing a Phone Call

Figure 12

Process of Requesting Audio Content

SMART HOME HUB

CROSS-REFERENCE TO RELATED APPLICATIONS

A Substitution Application for the previously Filed application Ser. No. 12/636,678

STATEMENT REGARDING FEDERALLY SPONSORED RESEARCH OR DEVELOPMENT

Not applicable.

BACKGROUND

1. Technical Field

The present invention relates generally to the field of end user telecommunication networking, such as router, television Set Top Box (STB), Wireless High Speed Modems, Digital Subscriber Line (DSL) or other devices. This disclosure relates to devices' integration, multiple functionality, and intelligent operation in the use of including multimedia, telephony, computing, security and automation, personal data and content storage. Still more particularly, the illustrative embodiments are directed to integrated components including a STB, telephone modem, wireless modems, Optical Network Terminal (ONT), Very-high-speed Digital Subscriber Line (VDSL), data server, video server, solid-state storage, game servers, and an Internet Protocol (IP) intelligent gateway router.

2. Background

The Television (TV) cable industry is moving toward innovative solutions utilizing smart STB with Digital Video Recorder (DVR) for multiple TV sets. Also, simplification and convenience are becoming the new tools for ease of use. Multifunction features are added to multimedia device functions to provide ease in operation, easy menu features and creative video middleware software. Users currently switch between multiple TV remote controls and STB for TV channel viewing and contents recording. Access to multiple TV contents and channels has become easier at home through cable TV providers and common carriers via Fiber To The Home (FTTH) solutions. The STB and DVR are useful devices for home entertainment for viewing 100s of TV channels, recording and playing favorite programs, access Video On Demand (VOD), Pay Per View (PPV) event watching and listing to multiple high quality audio channels. Creative video middleware eases the user access to a simple channels and contents menu for contents selection and reviews. Multifunction remote controls give multiple function utility for STB, TV, DVR and Videocassette Recorder (VCR).

The Internet has become an essential tool in our lives today. To access the Internet, users utilize broadband access like Digital Subscriber Line (DSL), cable modem, dial up, public wireless hot spots, or carrier's FTTH. The Internet access will allow for viewing and downloading contents as well as data communications between pluralities of users. Internet access is used for research and education, commerce and trade, entertainment, communication, financial and more. Internet access requires the users to subscribe to a cable company, an Internet Service Provider (ISP), or a licensed carrier. Internet access speed depends on the provider and user preference. ISPs now can provide 30 Mb/s over FTTH with potential increase up to 100 Mb/s using Gigabit Passive Optical Network (GPON). The bandwidth may increase to 1 Gigabit or more using wavelength service or other services, for example, Gigabit Ethernet Passive Optical Network (GEPON), Optical access, and Gigabit Ethernet.

The present day telephony is quite sophisticated and equipped with multiple features such as call waiting, three-way calling, voicemail and more. Soft switch has replaced the normal analog voice switch for Public Switched Telephone Network (PSTN), and Analog telephony networking is being complemented by Voice over Internet Protocol (VoIP). Mobile phones have been improved to offer Internet access and other applications.

Home and business security monitoring and facility automation has become essential and a part of the insurance requirements in many cases. Multiple sensors and cameras are used to manage the security of a facility. Also, home and facility automation requires numerous commands and control devices, which are transmitted to a centralized location or locations for management.

In general, multimedia, internet, telephony, and a facility's security and automation have become essential to an everyday user's lifestyle. Today, multiple devices are used for home automation, security, voice, data and multimedia applications, and the present invention provides a method and device for an integrated smart hub. This integrated smart hub provides saving space, power, and a user friendly device with centralized features.

SUMMARY OF THE INVENTION

The present invention provides a method and device for integrating a plurality of devices and features including ONT, Wireless Fidelity (Wi-Fi) modem (IEEE 802.11 b/g/n), Bluetooth® Modem, DSL modem, STB, DVR, VCR, telephone (VoIP) modem, Motion Picture Experts Group Layer-4 (MPEG-4) modem, Motion Picture Experts Group Layer-2 (MPEG-2) modem, optional wireless broadband such as Long Term Evolution (LTE) transceiver, optional Worldwide Interoperability for Microwave Access (WiMAX) modem (IEEE 802.16 with wireless broadband standards), data, and multimedia content servers and data storage devices or components. The Integrated Smart Hub provides a capability with a simple and an easy process to operate the device. The integrated device utility includes applications in the areas of telephony, Data processing, multimedia, augmentative communication, personal computing, home or facility security and automation.

In view of the foregoing, it is an object of the present invention to provide a plurality of features including a STB function, media storage and management, video content management, live video management, music content management, music streaming management, video conferencing management, video games management, data content management, voice conferencing, telephony management and home/facility automation and security management.

In view of the foregoing, it is another object of the present invention to provide a plurality of interfaces including multiple Universal Serial Bus (USB), Fiber Optical Interface (FOI), Wi-Fi, Bluetooth®, VDSL, Gigabit Ethernet (Gig-E), Multimedia over Coax (MOCA), Radio Grade 11 (RG-11), 10/100/1000 Mbps Full Duplex Ethernet (RJ-45), Personal Computer Memory Card International Association (PCM-CIA), audio interfaces, video interfaces, multiple standard serial interfaces, controls, and other devices.

It is another objective of the present invention to provide Quadruple Play (4-Play) integrated and interactive features. The 4-Play includes media (video and audio), data processing, telephony, wireless contents and services. The integrated interactive features, for example, include a user:

watching a streaming movie or live TV on a laptop or a TV screen, text messaging from the remote command and control, using the remote command and control display or a TV set, obtaining a Caller Identification (Caller ID) and managing telephony features on a TV set while watching a TV program, Accessing multiple screen windows for multi-activity on any display including a TV, or a laptop with the STB middleware features, interacting with PC application from a TV monitor, managing a phone call from a TDM phone, VoIP phone, a remote command and control, and a PC, or a laptop, making a video conference from a PC, a laptop or using a TV set, camera, or a remote command and control, monitoring a plurality of security cameras in different windows on a TV, PC, or a laptop, communicating using the wireless broadband feature, managing facility or home automation and security from a plurality of local devices, such as the remote command and control, and a laptop, or a PC, Managing and controlling music, video, telephony, and data from any interactive device with a display.

It is another objective of the present invention to provide an intelligent processor, which is coupled with a back up processor for processing and management of the integrated smart hub and other applications.

It is another objective of the present invention to provide a multiple device interface controllers for configurations management.

It is another objective of the present invention to provide a dual load-sharing power supplies.

It is another objective of the present invention to provide dual power buses to feed all internal elements.

It is another objective of the present invention to provide compact modular internal components.

It is another objective of the present invention to provide solid-state hard drives and storage devices.

It is another objective of the present invention to provide an 8 hours back up batteries for lifeline telephony.

It is another objective of the present invention to provide a multiple remote commanded and control for using and managing the integrated smart hub or other devices connected to the integrated smart hub.

As stated above, the newly disclosed device overcomes the disadvantages inherent in the prior art. It is to be understood that this disclosure is not limited in its details of construction. Also, it is to be understood that phraseology and terminology employed herein are for the purpose of description and should not be regarded as limiting.

Accordingly, those skilled in the art will appreciate that the concept upon which this invention is based may readily be utilized for the design of other devices for carrying out the purposes of this present invention. Therefore, it should also be realized by those skilled in the art that such equivalent constructions do not depart from the spirit and scope of the disclosure as set forth in the appended claims.

DETAILED DESCRIPTION OF THE DRAWINGS

The numerous innovative teachings of present application are described with particular reference to presently preferred embodiments.

Figure 1:
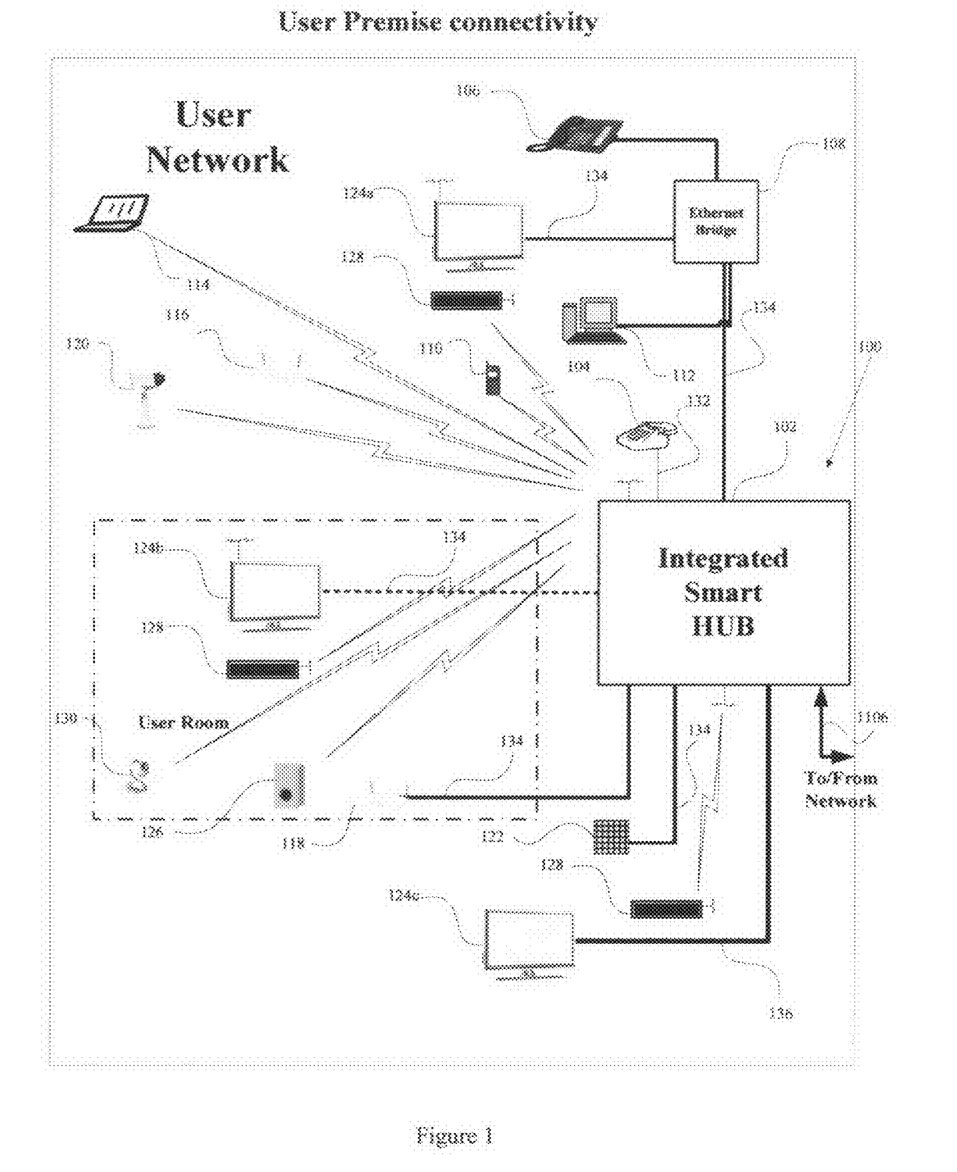
FIG. 1 is a comprehensive view of an integrated smart hub connectivity in a user network.

Referring to drawings, FIG. 1 shows a general view 100 of the integrated smart hub 102. The user network may be a home, a business, or another facility. For telephony applications, the FIG. 1 shows the integrated smart hub is connected to an analog phone 104 using RG-11 connector/interface for traditional phone service. The traditional phone connectivity utilizes two wires or a twisted pair 132. Also, the integrated smart hub is connected to a VoIP telephone 106 using an Ethernet port. In FIG. 1, the VoIP phone 104 is connected to the integrated smart hub 102 through an external Ethernet bridge 108. The interface connector is RG-45 using Category 5 (CAT-6) or Category 5 (CAT-5) wiring 134. Wireless phone 108 is used with the integrated smart hub 102 WiFi feature.

The data connectivity in the user network connects appliances and fixtures including Personal Computers (PC), laptops, security cameras, video conferencing cameras, audio speakers, facility security elements and facility automation, management and administration controls elements. FIG. 1 shows PC 112 is connected to the integrated smart hub 102 using an Ethernet port. In FIG. 1, the PC 112 is connected to the integrated smart hub 102 through an external Ethernet bridge 108. The interface connector is RG-45 using CAT-6 or CAT-5 wiring 134. Also, FIG. 1 shows the laptop 114 is wirelessly connected to the integrated smart hub 102 using WiFi feature. If the laptop or any wireless capable application element is distant away from the integrated smart hub 102, connectivity may be achieved by using wireless repeaters 116 or wireless access point 118. A facility or home security monitoring and management utilize security cameras, access control and other relay elements. A security camera 120 is connected wirelessly to the integrated smart hub 102 using WiFi feature as described above. The security camera 120 and security elements may be connected to a centralized facility automation management and control 122 which is further connected to the integrated smart hub 102. The centralized facility automation management and control 120 is connected to the integrated smart hub 102 using Ethernet. Also, the centralized facility automation management and control 122 may be connected wirelessly to the integrated smart hub 102 using WiFi feature. The centralized facility automation management and control 122 is external to the integrated smart hub 102 and is a collection source for the home automation devices, and alarm elements.

The multimedia includes audio and visual content interaction in the form of TV viewing, audio, gaming, publishing, and computing applications. TV applications include viewing live TV, Pay Per View (PPV), Video On Demand (VOD), recording, storing, and retrieving video contents. Audio applications include listening to a live broadcast, and recorded audio content, recording, storing, and retrieving the audio content. Publication and computing applications include E-commerce, E-health, E-education, video conferencing, gaming, and content sharing applications. FIG. 1 also shows the integrated smart hub 102 is connected to a TV 124a using an Ethernet connection. The TV 124a is connected to the integrated smart hub 102 through an external Ethernet bridge 108. The interface connector is RG-45 and uses CAT-6 or CAT-5 wiring 134. TV 124b is connected wirelessly to the integrated smart hub 102 using the WiFi feature. The TV 124b may also be connected directly to the integrated smart hub 102 using CAT 5/6 wiring 134 and RG45 Ethernet port interface. TV 124c is connected to the integrated smart hub 102 using coaxial cable 136 and BNC/TNC 75 ohm port interface. Additionally, FIG. 1 shows the integrated smart hub 102 is connected to a remote command and control 128 wireless capability and uses the WiFi feature and Bluetooth. The remote command and control 128 has a plurality of features and functions including control TVs by peering or mating with a certain TV set through the integrated smart hub 102, control video camera 130 for video conferencing, enter text command, control and manage a facility such as room temperature, speakers, audio volume level control, playing and controlling video games, managing video and audio programming and contents via the video middleware. The remote command and control 128 includes VoIP telephone features with a display to answer and make phone calls.

Figure 2:
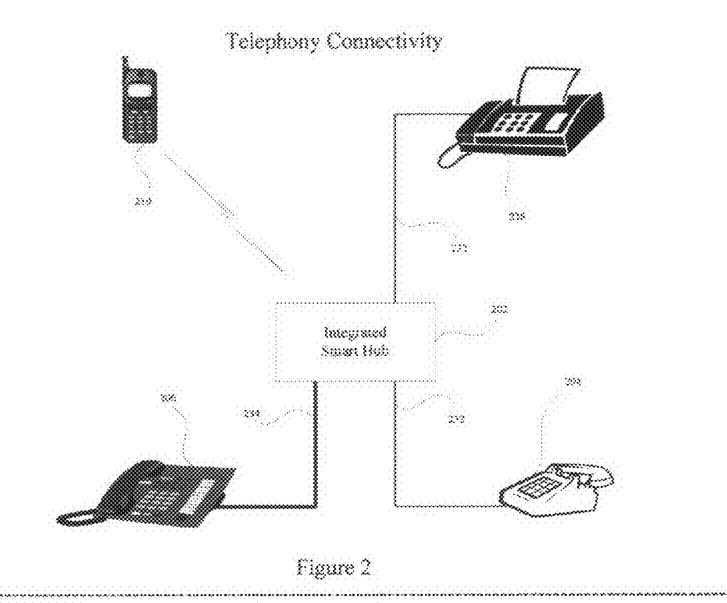
FIG. 2 shows an integrated smart hub telephony Applications.

FIG. 2 shows a telephony connectivity feature 200. In FIG. 2, the integrated, smart hub 202 is connected to an analog or Time Domain Multiplexing (TDM) phone 204 via twisted pair 232 or typical telephone wiring with RG-11 jack at both ends. The integrated smart hub 202 includes a programmed G.711 or G.729 VoIP CODEC feature to convert the signaling protocol to Session Initiation Protocol (SIP) or H323 depending on the carrier used for voice services. The VoIP phone 206 connects to the integrated smart hub 202 using 10/100 Ethernet protocol over CAT 5/6 cable. The interface jack is RG-45 at both ends. The signaling and bearer packets are routed to one dedicated Virtual Local Area Network (VLAN), not shown in FIG. 2, and is based on the industry standards to a common carrier for a call processing and completion. The wireless phone 210 utilizes VoIP protocol over WiFi. The wireless phone 210 communicates with the integrated smart hub 202 using the WiFi feature. The call is processed similar to the VoIP phone 206. The facsimile machine 238 is connected similar to the TDM phone and G711 protocol and is used to process a facsimile transmission.

Figure 3:
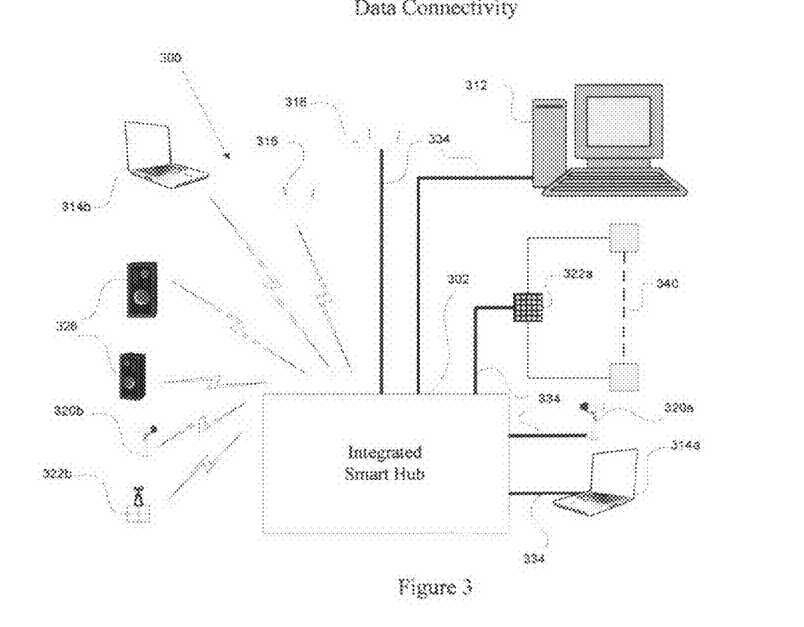
FIG. 3 shows an integrated smart hub data Application.

FIG. 3 shows a data connectivity feature 300. The integrated smart hub 302 is connected to a PC 312, an access point 318, a centralized facility automation management and control 322, a security camera 320 and a laptop 314a using 10/100 Ethernet protocol over CAT 5/6 cable 334. The interface jack is a RG-45 at both ends. Other devices including the security camera 320a may utilize USB interface ports. Alarm and control points 340 are collected by the centralized facility automation management and control 322. The signal from each element is routed to the integrated smart hub 302 internal IP router, not shown in FIG. 3, for routing the signal to the corresponding internal processor, not shown in FIG. 3. The wireless devices such as wireless repeater 316, wireless centralized facility automation management and control 322b, wireless security camera 320b, audio speakers 326 and a laptop 314b are connected to the integrated smart hub 302 via WiFi capability feature in the integrated smart hub 302. The integrated smart hub 302 internal WiFi transceiver receives the signals from all the wireless devices, and delivers the signals to an internal IP router via internal signal processor module (not shown in FIG. 3).

Figure 4:
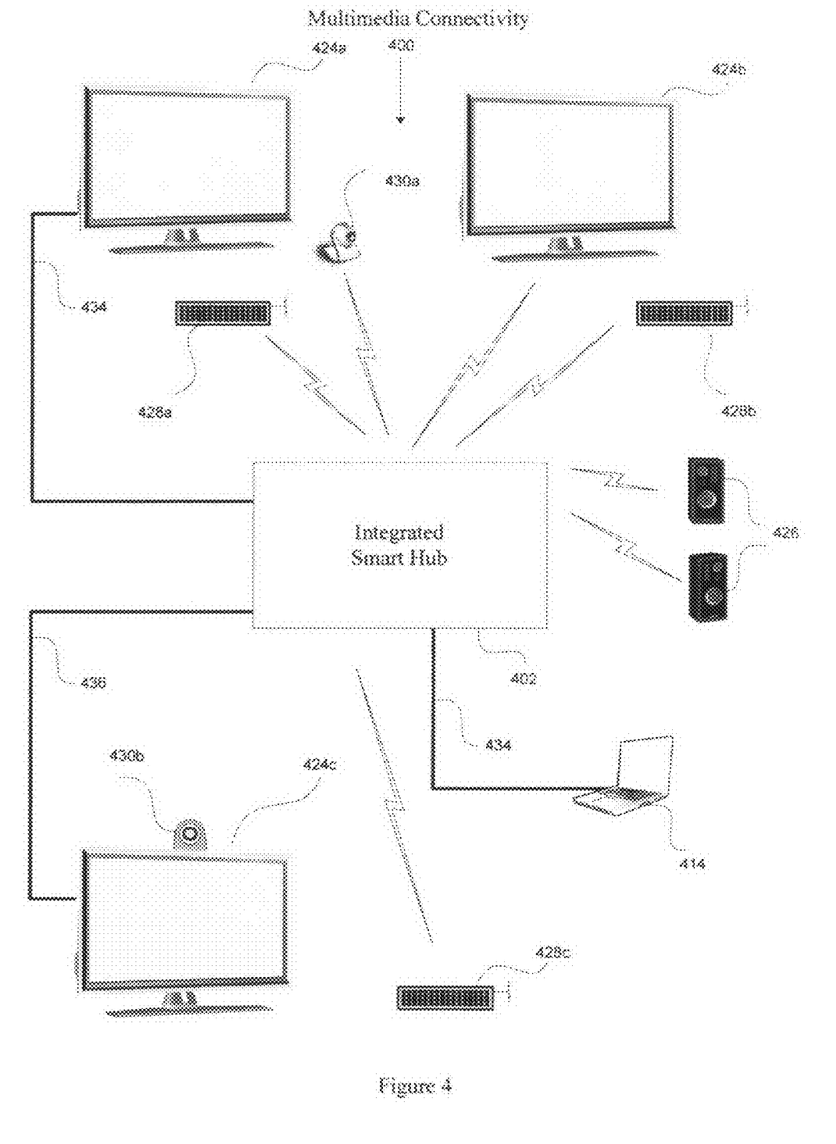
FIG. 4 shows an integrated smart hub multimedia application.

Referring to drawings, FIG. 4 shows the multimedia connectivity feature 400. The integrated smart hub 402 is connected to a TV 424a and a laptop 414 using CAT 5/6 cable 434 with RG-45 interface jack at both ends. The TV 424c is connected to the integrated smart hub 402 using 75 ohm coaxial cable 436 with TNC/BNC or proper RG-59 connectors at both ends. The TV 424b, the wireless cameras 430a and 430b, wireless speakers 426 and the wireless remote command and control devices 428a, 428b and 428c are connected wirelessly to the integrated smart hub 402 using WiFi capability feature in the integrated smart hub 402. The integrated smart hub 402 internal WiFi transceiver receives the signals from all wireless devices or elements and delivers the signals to an internal IP router via internal signal processor module (not shown in FIG. 4). The wireless remote command and control devices 428a, 428b and 428c are connected also wirelessly to the integrated smart hub 402 using Bluetooth capability feature. The integrated smart hub 402 internal Bluetooth transceiver receives signals from the wireless remote command and control devices 428a, 428b and 428c, and delivers the signals to an internal IP router via internal signal processor module. The remote command and control 428 has a plurality of functions including a VoIP telephone, a TV/DVR/STB remote control, a game controller, a facility/home admin controller, configuration management, and a monitoring activity display. The remote command and control 428 has a plurality of features and functions including control TVs by peering with the certain TV set through the integrated smart hub 402, control video camera 430 for video conferencing, enter text command, control and manage facility elements such as room temperature and speakers audio volume level, play and control video games, and managing video and audio programming and contents via the video middleware. The remote command and control 428 includes VoIP telephone features with a display to answer and make phone calls. The remote command and control 428 includes speaker phone and microphone features for speech communications.

Figure 5:
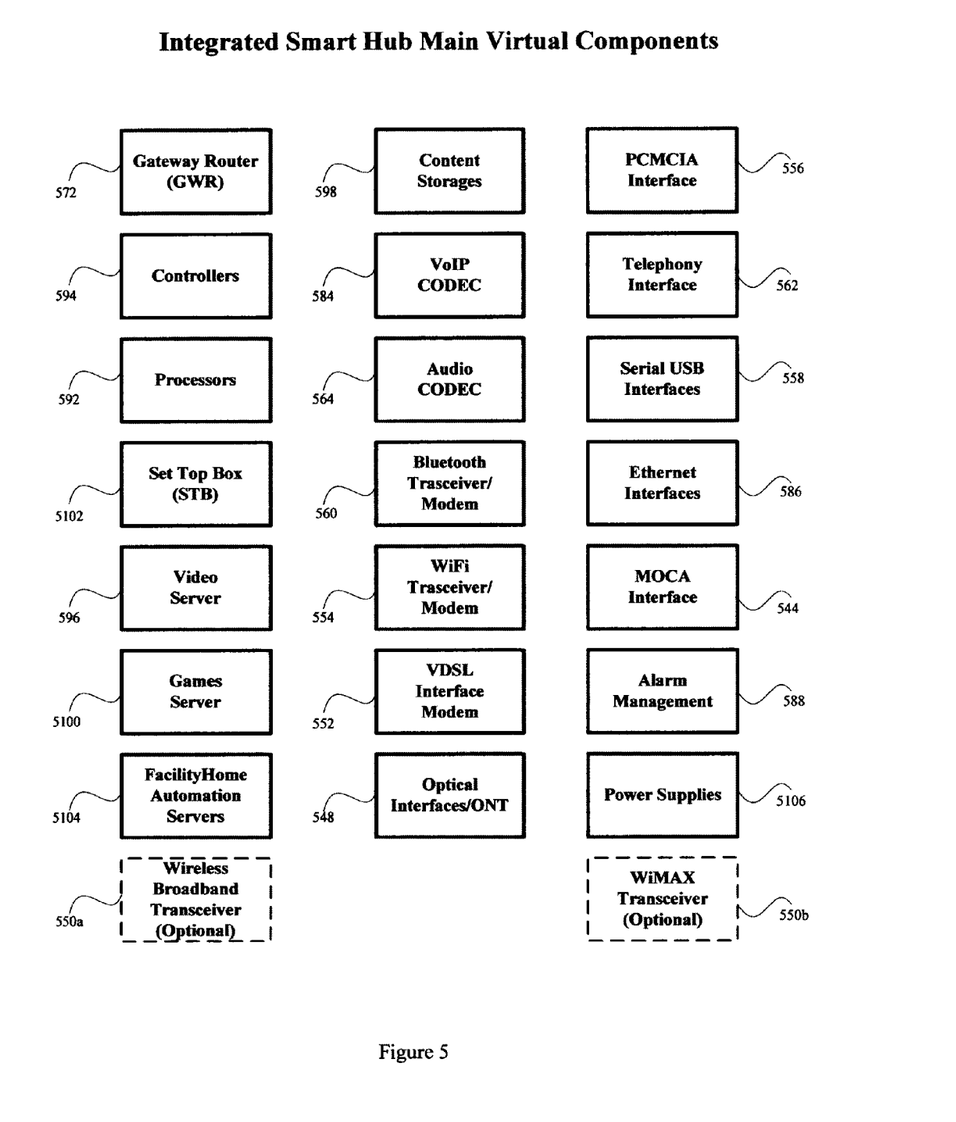
FIG. 5 shows integrated smart hub main components.

Referring to drawings, FIG. 5 shows an integrated smart hub with its main virtual components 500. The main virtual components are connected via the IP gateway router and/or the internal Ethernet bus, and include:

The IP Gateway Router 572:

The IP gateway router 572 is an internal element and it routes the signal based on routing tables that determine configuration of the integrated smart hub and stored in the controller module 594. Primarily, it delivers IP packets between its ports based on the address destination and the routing tables. It connects the integrated smart hub interface ports to the proper application processors, server, codec or other internal components.

The Controllers 594:

There is a main controller and a back up controller. The integrated smart hub configurations, applications configurations, ports configurations, intelligent processing, and all internal elements configurations are stored in the main controller, and backup copies are stored in the backup controller. There is a link between the two controllers for updating and checking for each other's performance.

The Processors 592:

There are two main processors. These main processors conduct the integrated smart hub applications and operations.

The Set Top Box (STB) Function 5102:

The STB 5102 function component includes multimedia middleware, witch manages displayed menu, video content, streaming video broadcast, recording, content retrieving, audio streaming, audio content management, and playback stored content on the STB's Random Access Memory (RAM) or the video server 596. The STB 5102 also includes IPTV decoder which converts the video content from MPEG-2 and MPRG-4 to NTSC, PAL, SCAM or other digital television format. A user may store and retrieve contents from the remote command and control and using the display menu. The STB 5102 store retrieves content on the video server 596 or content server 598 based on the middleware and the commands initiated by the user. The STB 5102 includes at least 256 MB of RAM which makes the integrated smart hub capable of handling and displaying quality 3 Dimension (3D) High Definition TV (HDTV) on the attached TV sets, displays quality graphics and manages sophisticated internet video games.

The Video Server 596:

The video server 596 stores and manages the video content. The video server receives the commands from the STB 5102 and directs the stored content to the STB 5102. The video server 596 has multi-sector solid-state contents storage and storage management processor. Initially, a minimum of 8 storage sectors are included with 128 GB of memory for each storage sector. The number of memory sectors may be expanded for future storage needs.

The Games Server 5100:

The game server 5100 is used for storing and managing the video games. The game server 5100 receives commands from the remote command and control and STB 5102. The game server 5100 has solid-state content storage and game management processors. The game server 5100 has 64 GB of solid-state memory and 256 MB of RAM. Depending on the game software, the user downloads the games from the interne or through any peripheral attached to one of the integrated smart hub serial ports.

The Facility/Home Automation Server 5104:

The facility/home automation server 5104 function is to manage facility alarms and controls, and as well as other aspects such as air-condition, heating, and shutters. Since there is a significant customization due to different requirements and different devices' specifications, this server has to have a customized configuration. The customized configuration is based on the software and to an extent for the required processing. There are off the shelf products that may be easily integrated with the integrated smart hub.

The Content Storage 598:

The content storage 598 has a flash driver and stores content that a user desires. Contents include personal files, images, video clips, publication, and music. The integrated smart hub's processor 592 and internal flash driver (not shown in FIG. 5) will manage the content storage based on the user commands from the remote command and control or any attached PC or laptop. The content storage element will act as flash drive and the content can be displayed on any attached display device, such as PC, laptop, TV or the remote command and control. The content storage 598 has multi-sector solid-state memory. Initially, a minimum of 4 storage sectors are included with 128 GB of memory for each. The number of memory sector may be expanded for future storage needs.

The VoIP Codec 584:

The VoIP codec 584 acts as VoIP modem and encodes and decodes the telephone analog/TDM voice into a VoIP standard format such as G.711, G.729 and the signaling into a SIP format to be carried over public or private internet service. Telephony features are dependent on the loaded software and the service provider. For facsimile transmission, G.711 is used.

The Audio Codec 564:

The audio codec 564 converts the analog audio into standard digital audio format for processing and distribution to local interfaces as configured by a user.

The Bluetooth Transceiver/Modem 560:

The Bluetooth transceiver/modem 560 converts the wireless Bluetooth format to a standard digital format.

The WiFi Transceiver/Modem 554:

The WiFi transceiver/modem 554 converts the wireless WiFi format into a standard format.

The VDSL Modem 552:

The VDSL modem 552 converts the VDSL format to a standard digital format. Primarily, VDSL2 is used due to its capability of delivering a higher bandwidth (50 Mb/s). VDSL2 format/modulation is an access method used by carriers to carry multimedia or triple play traffic over phone lines.

The Optical Interfaces 548:

The optical interface 548 convert the light-wave signal that carried over optical fiber interface to electric signal in a form of data stream using Ethernet standard format. One interface will act as ONT for carriers' GPON standard access services, and the other optical interfaces may provide local interface for intra facility communications over a single or multimode optical fiber.

The PCMCIA Interface 556:

This interface will provide for memory or flash driver to upload or download contents to and from the integrated smart hub.

The Telephony Interfaces 562:

The telephone standard interfaces 562 are RG-11 Jack types and are present to connected external traditional TDM phones to the integrated smart hub. The interfaces are connected internally to the VoIP codec 584 for a call processing.

The Serial Bus Interfaces 558:

The serial bus interface 558 such as USB and other legacy serial interfaces connect the external devices to the internal corresponding application processors via the IP gateway router 572. In this invention, multiple USB interfaces are used in an integrated smart hub.

The Ethernet Interfaces 586:

Multiple 10/100 Mb standard Ethernet interfaces 586 is utilized to connect external devices and services to the corresponding internal applications and processors via the IP gateway router 572.

The MOCA Interface 544:

This standard interface is used for traditional video services and to carry the multimedia signal between the integrated smart hub and the traditional TV sets.

The Alarm Management 588:

This component is used to collect an internal device's performance and alarms, and to provide for intelligent decision for each interface performance characteristics. Any performance degradation triggers a visible alarm and display an error message with codes on any of the integrated smart hub attached displays.

The Power Supplies 5106:

There are two internal load-sharing power supplies. The power supplies input is a commercial Alternate Current (AC). The AC voltage range from 100 VAC to 240 VAC, and the power cycle ranges from 50 Hertz (HZ) to 60 HZ. There is multiple output Direct Current (DC) voltage that range from 0.5 VDC and 20 VDC to support all internal modules. The power supplies include protection fuses, backup batteries, and control module. The batteries are designed to support a phone life line for up to 8 hours. The control module manages the load-sharing, switching to a single power supply if one power supply fails and switch to the backup batteries when the commercial AC fails.

The Optional Access 550:

The integrated smart hub is having optional slots to accommodate wireless broadband such as LTE or GSM-G4 transceiver 550*a* and WiMAX modem (IEEE 802.16 wireless broadband standards) 550*b*.

The objective is to equip the integrated smart hub with at least two external network accesses. Depending on the demography, user preference and available service provider, user can choose FTTH, Ethernet, WiMAX, XDSL, or wireless broadband for public network access.

Figure 6:
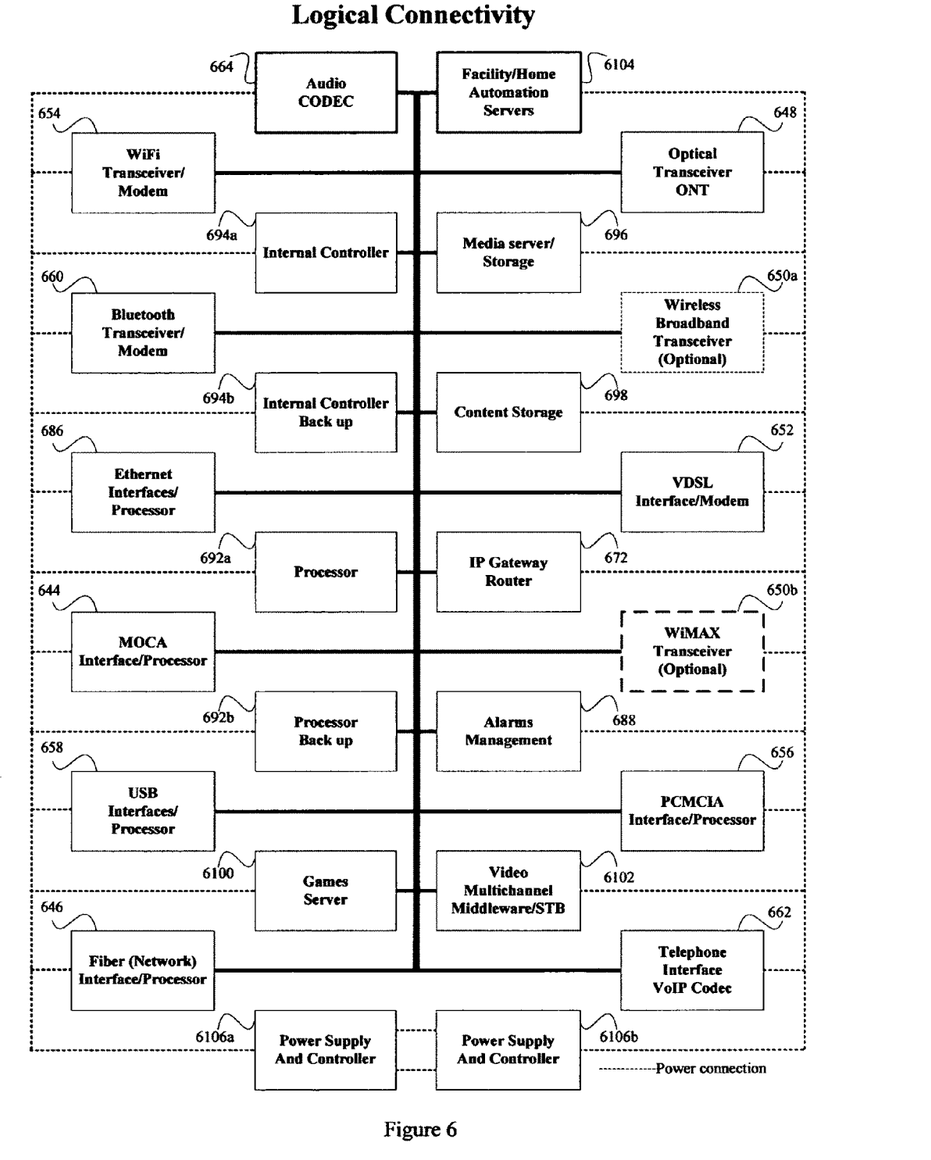
FIG. 6 shows an integrated smart hub logical connectivity.

Referring to drawings, FIG. 6 depicts a logical connectivity for the integrated smart hub 600. The integrated smart hub and its elements configurations are stored in controllers 694*a* and the back up controller 694*b*. The signal routing and connectivity are managed by the processors 692*a* & 692*b* based on the internal data packet information and the routing tables (if the data packet is at distant from the IP router). The DC power with different voltages is fed to all elements from two redundant DC power buses. The drawing also shows dual power-sharing power supplies 6106*a* & 6106*b*.

Figure 7:
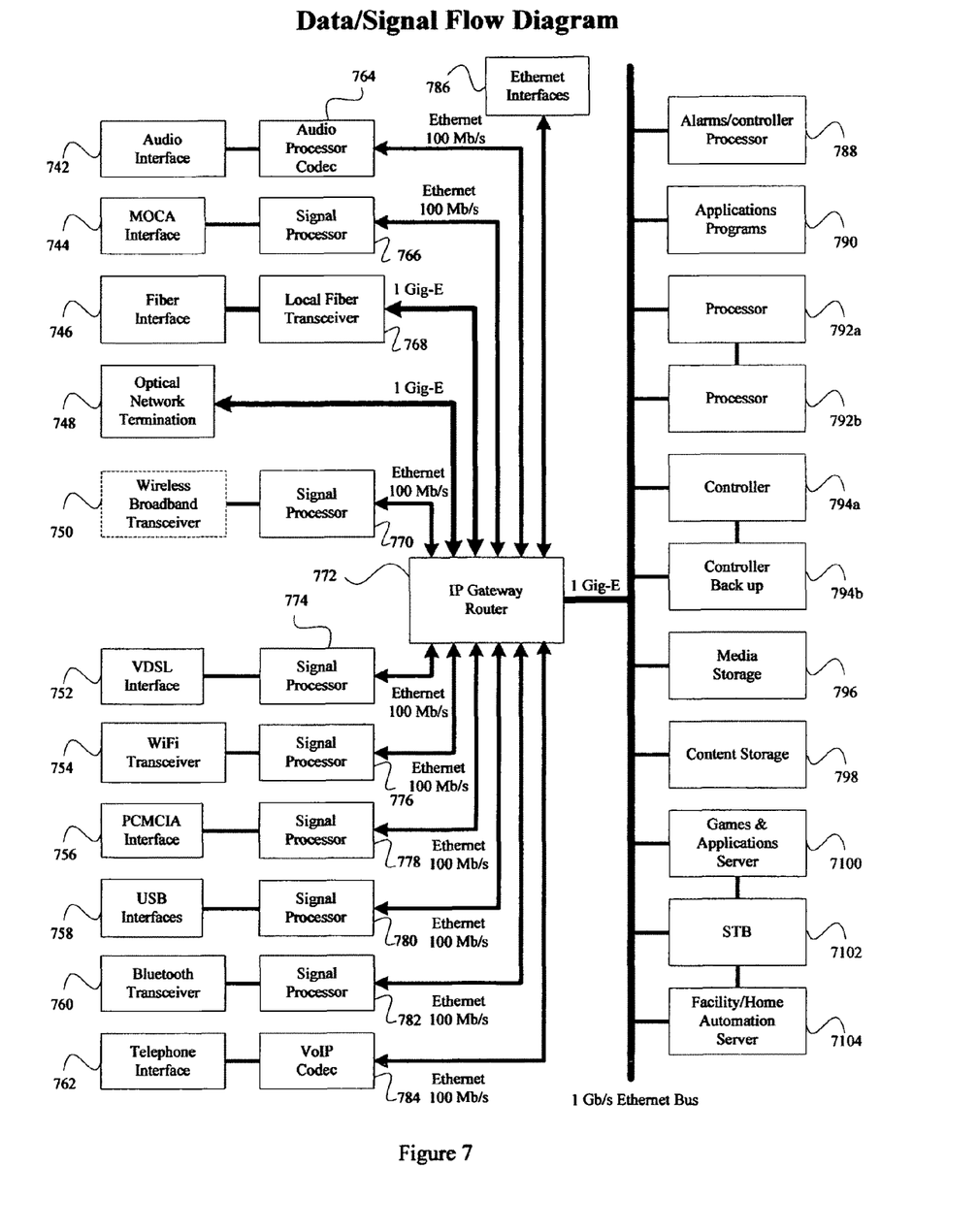
FIG. 7 shows an integrated smart hub data/signal flow diagram

Referring to drawings, FIG. 7 depicts data/signal flow diagram 700. The one Gigabit Ethernet (Gig-E) bus connects applications programs, alarm processor 788, a set of internal processors 792*a* & 792*b*, a set of internal controllers 794*a* & 794*b*, the media storage 796, the content storage 798, game and application server 7100, STB 7102, the facility/home automation server 7104, and the IP gateway router 772. The Ethernet packets are delivered based on the packet delivery information. The IP Gateway router 772 ports are connected to the Gig-e Ethernet bus and other ports as shown in FIG. 7. The IP gateway router 772 is responsible for routing traffic between ports based on routing tables that are stored in the integrated smart hub controllers 794*a* and 794*b*.

Figure 8:
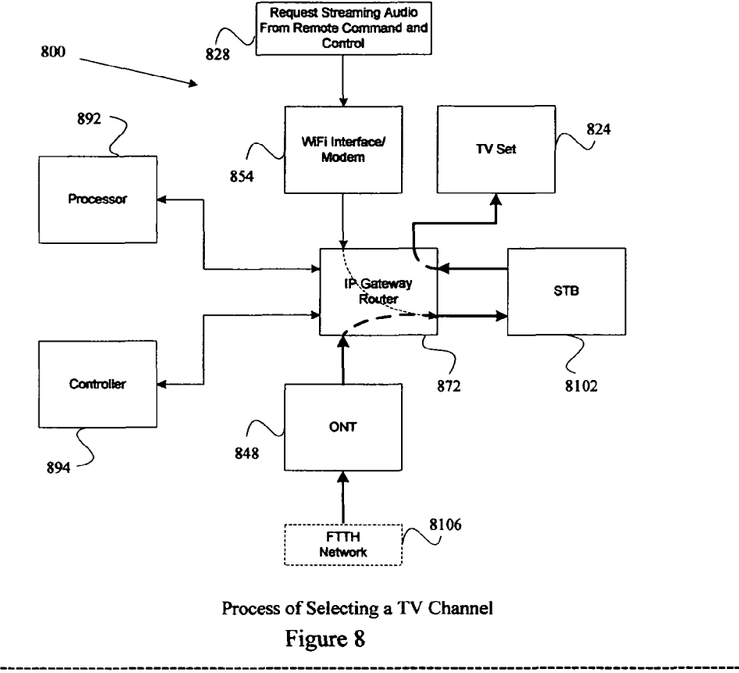
FIG. 8 is a flow chart showing a process of selecting a TV channel.

Referring to drawings, FIG. 8 depicts a process flow diagram for selecting a TV channel 800. A user selects a desired live multicast. TV channel from the remote command and control 828. The wireless command signal is received at the WiFi interface modem (transceiver) 854 and is routed to the IP gateway router 872. The IP gateway router 872 routes the command signal to the STB 8102 based the signal packet information and the stored routing table. The STB 8102 acts as virtual TV tuner, and routes the signal from the ONT 848 to the TV 824 via the IP gateway router 872. In FIG. 8, the ONT 848 receives the video signals or the triple play from the carrier FTTH network 8106. The video signal is encapsulated in a VLAN and the ONT 848 strips the video VLAN (layer 2) and converts it to an Ethernet format. The IPTV (Internet Protocol Television) capability of the GPON ONT can be used to provide digital television services over the ONT data Ethernet port. IPTV services consist of two separate types of traffic:

The streaming IP video, which is multicast downstream to a dynamically changing set of subscribers watching a TV channel.

The channel-change traffic uses Internet Group Management Protocol (IGMP).

An IGMP multicast group represents a TV channel to be watched by some subscribers. When a subscriber selects or changes a TV channel, the subscriber's STB sends IGMP messages to "join" or "leave" its membership in a multicast group. The IGMP protocol is terminated by the STB and by the service provider edge router, which may or may not also be in the video content delivery path. To control Layer 2 multicast of streaming IP video in response to the IGMP channel change traffic between STB and the provider service edge router, the provider Optical Line Termination (OLT) and ONT both perform IGMPv3 (RFC3376) Snooping. Snooping means the Layer 2 switches in the OLTs and ONTs, but do not modify, drop, or initiate the IGMP messages, indicating that subscribers want to "join" or "leave" a group membership for a TV channel as these messages pass through in the upstream direction. In response to their observations, the Layer 2 switches in the OLTs and ONTs forward TV channels downstream to the ONT port where subscribers request those channels. Each multicast leg is joined to a point where the desired channel is available as close to the subscriber as possible: i.e., in the ONT if possible; otherwise in the OLT. This way, a TV channel is delivered across each link in the network only if needed and no more than once.

Figure 9:
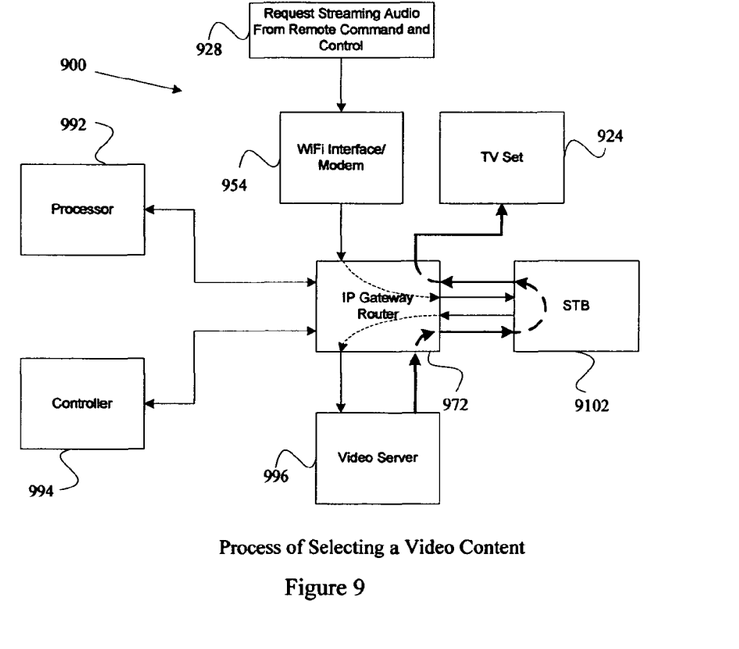
FIG. 9 is a flow chart showing a process of selecting a video content.

Referring to drawings, FIG. 9 depicts a process flow diagram for selecting a video content 900. A user selects a desired video content (a stored movie for an example) from the on screen menu using the remote command and control 928. The wireless command signal is received at the WiFi interface modem (transceiver) 954, and is routed to the IP gateway router 972. The IP gateway router 972 routes the command signal to the STB 9102 based the signal packet information and the stored routing table (not shown in FIG. 9). The STB 9102 forwards the request to retrieve content from the video server 996. Using the middleware, server 996 will forward the desired content to the STB 9102 then to the TV 924 via the IP gateway router 972.

Figure 10:
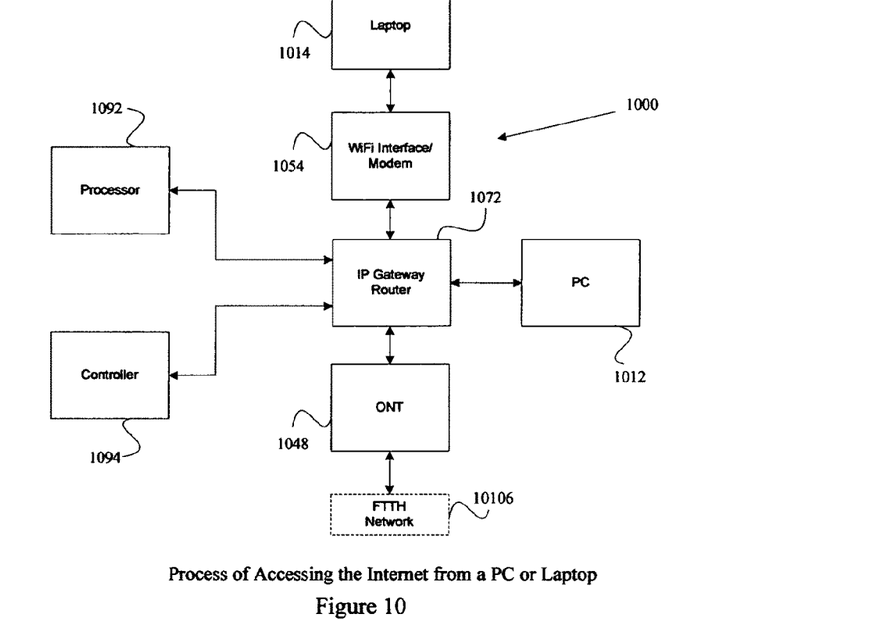
FIG. 10 is a flow chart showing a process of accessing the Internet from a PC, or laptop.

Referring to drawings, FIG. 10 depicts a process flow diagram for accessing Internet from a PC, or a laptop 1000. A user connects the PC 1012 to an Ethernet port which is routed to the IP gateway router 1072. The PC 1012 is virtually connected directly to the IP gateway router 1072. The laptop 1014 is connected wirelessly to the IP gateway router 1072 via the WiFi interface modem (transceiver) 1054. The IP gateway router 1072 forwards the user data signal and applications web page to the ONT 1048. In FIG. 10, the ONT 1048 receives the internet access or the triple play from the carrier FTTH network 10106. The data and internet is encapsulated in a VLAN and the ONT 1048 strips the data VLAN (layer 2) and converts it to an Ethernet format. This is typical as it is done today by FTTH providers.

Figure 11:
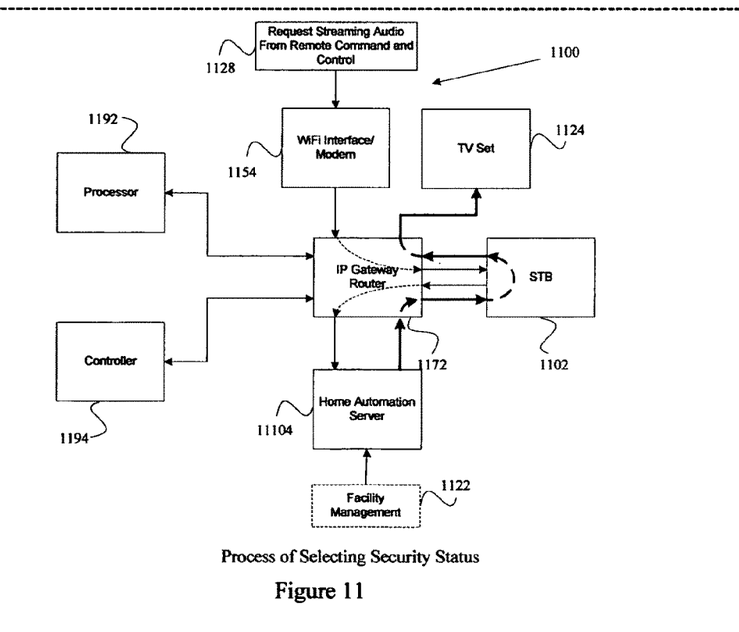
FIG. 11 is a flow chart showing a process for selecting a security status.

Referring to drawings, FIG. 11 depicts a process flow diagram for selecting a security status 1100. User may request a security status such as a camera view, or an alarm status by using the remote command and control, PC, laptop, and monitor the status using any r attached display or monitor. This figure shows an example using the wireless remote command and control 1128 and the TV 1124. The request is received by the WiFi interface/modem (transceiver), and forward to the IP gateway router 1154. The IP gateway router 1172 sends the request to the STB 1102 to requests the middleware to use a window on the TV monitor. The STB 1102 sends the data requested to the home automation server to process the request and retrieve the video streaming or the alarm status from the external facility management device 1122. The requested data or streaming video is routed to the IP gateway router 1172 and then sent to the STB 1102. The STB 1102 sends the requested data or video on a user selected window to the TV 1124 via the IP gateway router 1172.

Figure 12:
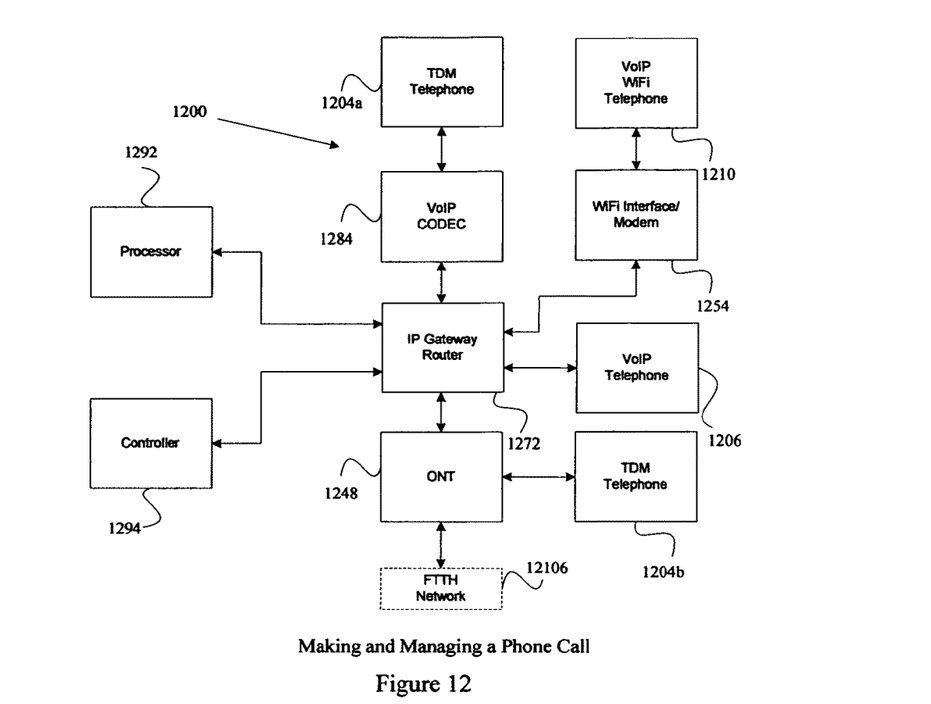
FIG. 12 is a flow chart showing a process of making and managing a phone call from TDM Telephone, wireless WiFi Telephone, or a VoIP telephone.

Referring to drawings, FIG. 12 depicts a process flow diagram for making, receiving, and managing a phone call 1200. The flow diagram shows a TDM telephone 1204a connected to the VoIP CODEC 1284 and a TDM telephone 1204b connected to the ONT 1248. The traditional telephone call may be processed via the VoIP CODEC 1284 and/or the ONT 1248 using a standard two wires telephone wiring and RG-11 telephone jack.

The VoIP application provides voice and data services for Plain Old Telephone Service (POTS) subscriber lines on the VoIP CODEC 1284. A POTS port on the VoIP CODEC 1284 is connected to a telephone 1204a (or voice services and/or a fax machine or dial-up modem that uses voice-service capabilities for data). The SIP-enabled VoIP capability enables POTS services using packet switching instead of traditional TDM circuit switching. A single User Agent (UA) in the VoIP CODEC 1284 provides VoIP capability for subscriber lines. Also, similar to the VoIP CODEC 1284, the ONT 1248 may be provisioned for the POTS-VoIP application instead of the POTS-TDM application, the analog signaling between the ONT 1248 and the subscriber's telephone 1204b is the same, but the ONT 1248 communicates through an IP packet network, rather than communicating with external Voice Gateway card and the provider's Class 5 switch. The call control signaling and the voice bearer traffic may follow separate paths through the IP network and may be transmitted simultaneously. For call control signaling, which uses the Session Initiation Protocol (SIP), the ONT 1248 UA communicates with a provider VoIP soft switch. For the voice bearer traffic, which is carried by a Real-time Transport Protocol (RTP), the ONT 1248 UA may communicate with a provider media server or a media gateway if the other party (caller) is using the circuit-switched Public Switched Telephone Network (PSTN). Provider's VoIP soft switches, unlike traditional TDM circuit switches, do not have to handle the voice bearer traffic. In order to provide voice services comparable to those with traditional TDM circuit switching, some of the VoIP services are dependent on performing additional functions within the VoIP CODEC 1284, or the ONT 1248 themselves. For example, the VoIP CODEC 1284 and the ONT 1248 provide call progress tones, DTMF signaling tones, and distinctive ringing patterns. The VoIP CODEC 1284 and the ONT 1248 also enable support of some of the Custom Local Area Switching Service (CLASS) features, such as displaying Caller ID and indicating Call Waiting. The VoIP CODEC 1284 and the ONT UA interwork with a voice application server (part of the soft switch) in accordance with a specified User-Network Interface (UNI) to implement some specific call services.

Referring to drawings, FIG. 12 depicts a process flow diagram for a VoIP telephone 1206 connected to the IP gateway router 1272 via a standard Ethernet connection. The VoIP telephone (SIP phone) 1206 is connected to provider soft switch and performs the same function that described above regarding the SIP signaling and the bearer traffic. The VoIP WiFi telephone 1210 is connected to a WiFi interface/modem (transceiver) 1254 wirelessly. The WiFi interface/modem (transceiver) 1254 is connected internally to the IP gateway router 1272 via a standard Ethernet connection. The process for managing a telephone call from the VoIP WiFi telephone 1210 is the same as the VoIP telephone 1206.

Figure 13:
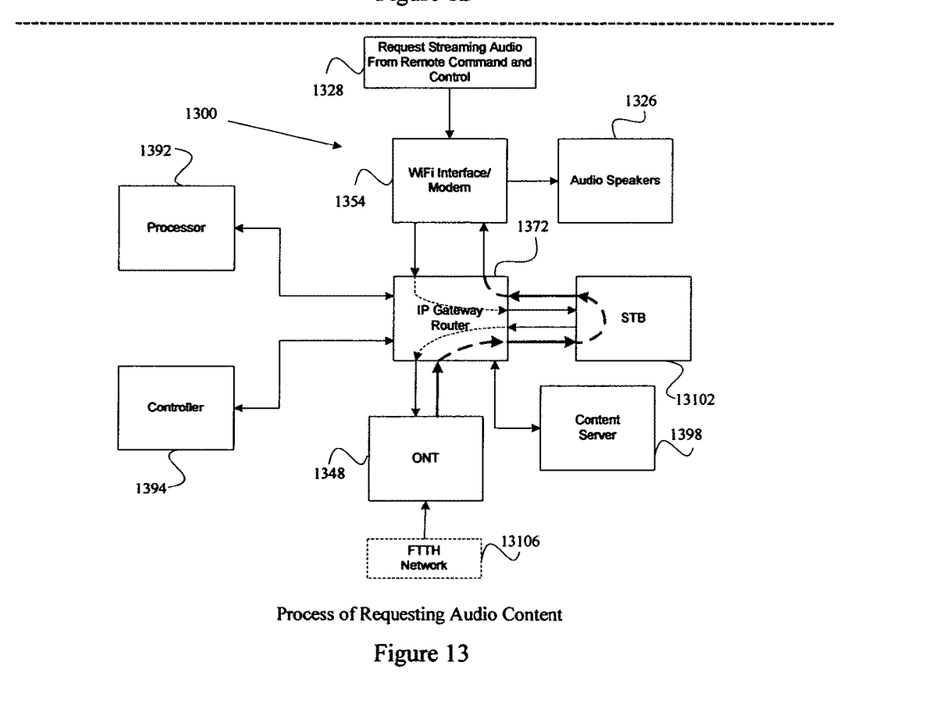
FIG. 13 is a flow chart showing a process of requesting audio content.

Referring to drawings, FIG. 13 depicts a flow diagram for a process of requesting an audio content 1300. This process is similar to the process in FIG. 8, and FIG. 9. If the content resides on the content server 1398, the process is similar to FIG. 9. If the content resides in on the provider server, the process is similar to FIG. 8, where the audio content signal is delivered to the FTTH network (provider network) 13106. The audio content signal is delivered in IP packets to the ONT 1348, and passed on to the IP gateway router 1372, where the STB 13102 manages an internal audio decoding. The audio content then passed to the WiFi speakers 1326 via the IP gateway router 1372 and the WiFi transceiver 1364. Depending on the integrated smart hub stored configuration, the audio decoding may be performed at the internal Audio CODEC (not shown in FIG. 13), STB 13102, external PC, external laptop, or other external audio devices.

Figure 14:
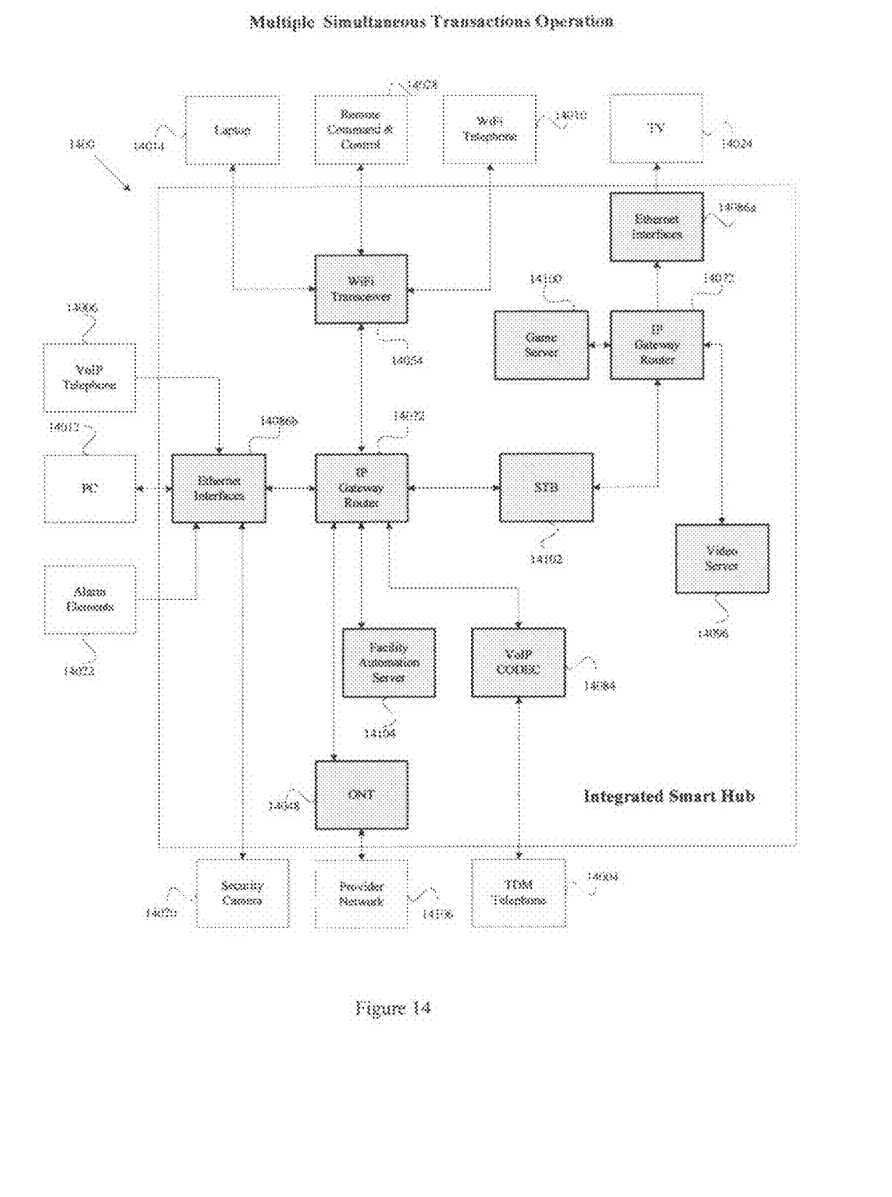
FIG. 14 is a flow chart showing a general operation of an integrated smart hub.

Referring to drawings, FIG. 14 depicts a process flow diagram for a smart hub for multiple simultaneous transactional operation 1400. The integrated smart hub allows for multiple operations and transactions simultaneously. For example, multiple users may request multiple video contents to be sent to multiple TV sets simultaneously, while other users conduct phone calls or requesting internet downloads at the same time. The multitasking is achieved by the software programs that reside on the processor module, stored configurations in the controller module, and routing tables on the IP gateway router. The standard IP packets are routed between virtual ports in the internal elements based on the address information in the header. For commands and requests for transaction or operation, the payload in the IP packet delivers the command information to the proper addressed element for execution. Each remote command and control is wirelessly connected to the integrated smart hub via secure WiFi feature. For example in FIG. 14, a user sends a request for a content to be displayed on TV set 14024 from the remote command and control 14028, which is connected to the WiFi transceiver 14054. The request is routed through the IP gateway router to the STB 14102 for execution. The STB 14102 sends a request to the video server 14096 to retrieve and send the specific content to TV set 14024 via the IP gateway router 14072, and the Ethernet interface 14086a. Please note: that although FIG. 14 shows two IP gateway routers 14072, there is only one IP gateway router 14072 and this was done for illustration clarity only. The Embedded middleware that resides in the STB 14102 allows for many video features and interaction simultaneously, such as display menu, and multiple window displays such as window for games, window for video conferencing, and window for weather channel, and content review from a menu on the same TV. The user also may request a live streaming video from a channel list by requesting the channel from the remote command and control 14028. The request will be routed to the STB 14102 through the IP gateway router 14072. The STB 14102 is connected to the ONT 14048 through the IP gateway router 14072. The streaming multicast video channel is delivered to TV 14024 via the IP gateway router and the Ethernet interface 14086a, as stated in FIG. 8.

Other user may use laptop 14014 to request an internet content download simultaneously, since the laptop is connected to the internet by assigning a dynamic IP address, through the IP gateway router 14072, ONT 14048 and to the provider network 14106. Another user may do the same function using a PC that connected to the provider network through Ethernet interface 14086, IP gateway router 14072, and the ONT 14048.

Another user may make phone calls using the VoIP WiFi telephone 14010 or the wired VoIP telephone 14006 using the same process as stated in FIG. 12. The TDM phone 14004 may utilize the VoIP CODEC 14084 or the ONT 14048 to manage telephone calls as described in FIG. 12.

The users may also monitor the facility alarms from the alarm elements hub 14022 and using the security camera 14020 while watching TV or using any laptop applications. At the same time the users may also send commands from the remote command and control 14028 to change the facility condition such as temperature using the facility automation server 14104, which is connected to the specific apparatus (not shown in the figure) that needs to be adjusted or changed for a desired condition, or an action.

I claim:

1. A method for an integrated smart hub for multicasting a plurality of functions comprising:
    receiving from an at least one user a desired content request from a wireless remote command control and command signal through an interface module;
    routing the request command signal to an Internet Protocol gateway router;
    routing the request command signal to a Set Top Box by the Internet Protocol gateway router;
    configuring the integrated smart hub with Long Term Evolution LTE GMS-G4 to the interface module and middleware in the Set Top Box specifically for the multicasting of each of the plurality of functions including:
        Quadruple Play (4-Play) which comprises: media including video and audio data processing, telephony and wireless services;
        text-messaging from the remote command control;
        interacting with a laptop or a personal computer applications from a television monitor;
        making conference call from the television monitor;
        managing phone call from Time Division Multiplexing TDM phone, VoIP phone, the laptop or the personal computer;
        making phone call from the laptop or the personal computer or the television monitor;
        managing a plurality of windows for multi-activities on a display including the laptop or the personal computer or the television monitor; and
    processing the desired content request by the Set Top Box equipped with the embedded middleware for executing the plurality of functions for the at least one user.

2. The method of claim 1, wherein the multicasting of the plurality of functions includes selecting a television channel, selecting the video and the audio content, accessing Internet from the laptop or the personal computer, selecting a security status, making or receiving and managing the telephone call, making or receiving and managing a video call, playing video games, requesting the audio content, data connectivity, and multimedia connectivity.

3. The method of claim 2, wherein the desired content request includes selecting the television channel, wherein the desired content request is processed by the Internet Protocol gateway router, the Set Top Box equipped with an embedded middleware and an Optical Network Terminal and Fiber to a Home access network, wherein the desired content request is displayed on the laptop or the personal computer or the television monitor.

4. The method of claim 3, wherein the desired content request includes selecting a video content, wherein the desired content request is processed by the Internet Protocol gateway router, the Set Top Box equipped with the embedded middleware and a video server, and wherein the desired content request from a content library menu is displayed on the monitor.

5. The method of claim 4 wherein the desired content request includes accessing Internet by the laptop or the Personal Computer, or a Laptop and selecting the video content, wherein the desired content request is processed by the Internet Protocol gateway router, the Set Top Box equipped with the embedded middleware, the Optical Network Terminal and the Fiber to the Home access network, and wherein the processed desired content request is displayed on the monitor.

6. The method of claim 5, wherein the desired content request includes selecting a security status, wherein the desired content request is processed by the Internet Protocol gateway router, the Set Top Box equipped with the embedded middleware and a Home Automation Server, and wherein the processed desired content request is displayed on the monitor.

7. The method of claim 6, wherein the desired content request includes selecting for making or receiving and managing a desired telephone call request, wherein the desired telephone call request is processed by the Internet Protocol gateway router, Voice over Internet Protocol VoIP codec, and the Optical Network Terminal and the Fiber to the Home access network, wherein telephone includes the Voice over Internet Protocol VoIP telephone or the Time Division Multiplexing TDM telephone, and wherein the desired request is transmitted over a telephone network.

8. The method of claim 7, wherein the desired content request includes selecting for a desired audio content, wherein the desired audio content request is processed by the Internet Protocol gateway router, the Set Top Box equipped with the embedded middleware and the Optical Network Terminal and the Fiber to the Home network access, and wherein the processed desired content request is delivered through audio speakers.

9. The method of claim 8, wherein the interface module is a transceiver.

10. The method of claim 9, wherein the wireless remote control and command includes a Wireless Fidelity WiFi transceiver, a Processor, a WiFi telephone, a game controller, a command, and a control keypad.

11. The method of claim 10, wherein the data connectivity for the desired content request is processed by the Internet Protocol gateway router, the Set Top Box equipped with the embedded middleware.

12. The method of claim 11, wherein the multimedia connectivity for the desired content request is processed by the Internet Protocol gateway router, the Set Top Box equipped with the embedded middleware, and wherein the processed desired content request is played by audio speakers and displayed on the monitor.

* * * * *